United States Patent [19]
Fairhurst et al.

[11] Patent Number: 5,355,370
[45] Date of Patent: Oct. 11, 1994

[54] CROSSPOINT MATRIX

[75] Inventors: Jon A. Fairhurst; Jay S. Baker, both of Grass Valley, Calif.

[73] Assignee: The Grass Valley Group, Inc., Nevada City, Calif.

[21] Appl. No.: 909,108

[22] Filed: Jul. 2, 1992

[51] Int. Cl.$^5$ ............................................. H04Q 11/04
[52] U.S. Cl. ..................................... 370/58.1; 370/54; 340/825.79
[58] Field of Search ...................... 370/84, 112, 110.1, 370/58.1, 58.2, 58.3, 85.9, 85.1, 61, 60, 60.1, 54, 68.1; 340/825.79, 825.80; 358/183; 307/243, 244; 328/153, 154; 348/705, 718, 719

[56] References Cited
U.S. PATENT DOCUMENTS
| | | | |
|---|---|---|---|
| 4,837,763 | 6/1989 | Sasaki | 370/112 |
| 4,926,423 | 5/1990 | Zukowski | 370/112 |
| 5,130,985 | 7/1992 | Kondo et al. | 370/94.1 |

Primary Examiner—Douglas W. Olms
Assistant Examiner—Ajit Patel
Attorney, Agent, or Firm—John Smith-Hill; Francis I. Gray

[57] ABSTRACT

A crosspoint matrix with integrated matte generators includes double buffered internal storage registers which may be serially loaded with mode and selection data to enable the crosspoint matrix to operate in a crosspoint mode wherein a selected input bus is directed to selected output bus. Further, the crosspoint matrix may be operated in a matte generator mode wherein the stored data is supplied to the output bus as a matte signal. The matte signal may be selectively toggled through a series of values to enable operation with both D1 and D2 signals. The data is latched in response to a vertical pulse which enables data values to be written in non-real time as a background task while the actual switch of data is accomplished only upon receipt of a vertical pulse.

10 Claims, 4 Drawing Sheets

CROSSPOINT MATRIX

BACKGROUND OF THE INVENTION

This invention relates to video switchers and more particularly to a crosspoint matrix.

In a typical video switcher, a crosspoint matrix is employed to connect one of several external signal sources to an output terminal.

A video switcher may include several matte generators, each of which generates a matte signal representing a solid color. The matte signal may be employed as a background video signal, for example. The matte generators are connected to respective inputs of the crosspoint matrix, and each matte signal may be directed through the crosspoint to a particular output. This implies that the complexity of the crosspoint matrix depends not only on the number of external signal sources but also on the number of matte generators.

SUMMARY OF THE INVENTION

The present invention provides a crosspoint matrix with integrated matte generators wherein the various outputs may be selectively programmed to operate either in a crosspoint mode wherein a selected input is directed to a selected output or in a matte generator mode wherein a stored value is provided at the output. The stored matte value for matte generator mode or input selection data for crosspoint mode may be serially loaded into storage buffers and then latched in response to a latch pulse signal. The serial data is also used to select in which mode the crosspoint matrix operates as well as providing output enable control.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
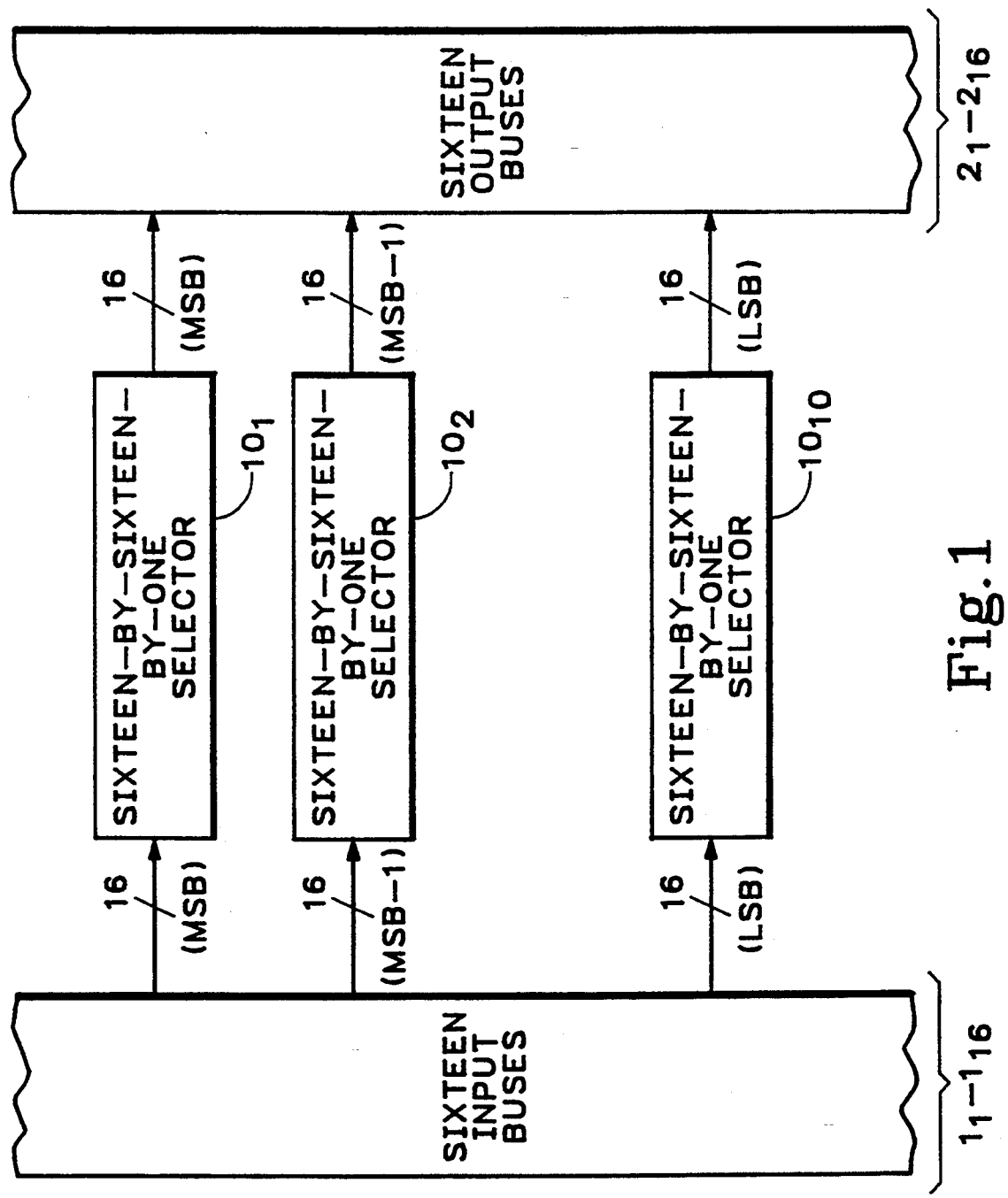
FIG. 1 is a block diagram of a sixteen-by-sixteen crosspoint matrix with integrated matte generators.

The crosspoint matrix shown in FIG. 1 is connected between sixteen input buses $1_1$-$1_{16}$ and sixteen output buses $2_1$-$2_{16}$. Each input bus is connected to an external video signal source (not shown) and each output bus is connected to a utilization device (not shown). In a practical implementation of the invention, each input bus 1 includes ten data lines and each output bus 2 also includes ten data lines. The sixteen MSB lines of the input buses respectively are connected to the sixteen input terminals of a sixteen-by-sixteen-by-one crosspoint device $10_1$ whose sixteen output terminals are connected to the sixteen MSB lines of the output buses respectively. Similarly, the sixteen second most significant bit lines of the input buses are connected to the sixteen input terminals of sixteen-by-sixteen-by-one crosspoint device $10_2$ whose sixteen output terminals are connected to the sixteen second most significant lines of the output buses. In general, the sixteen pth significant bit lines of the input buses are connected to the sixteen input terminals of sixteen-by-sixteen-by-one crosspoint device $10_p$, whose sixteen output terminals are connected to the sixteen pth significant lines of the output buses.

Figure 2:
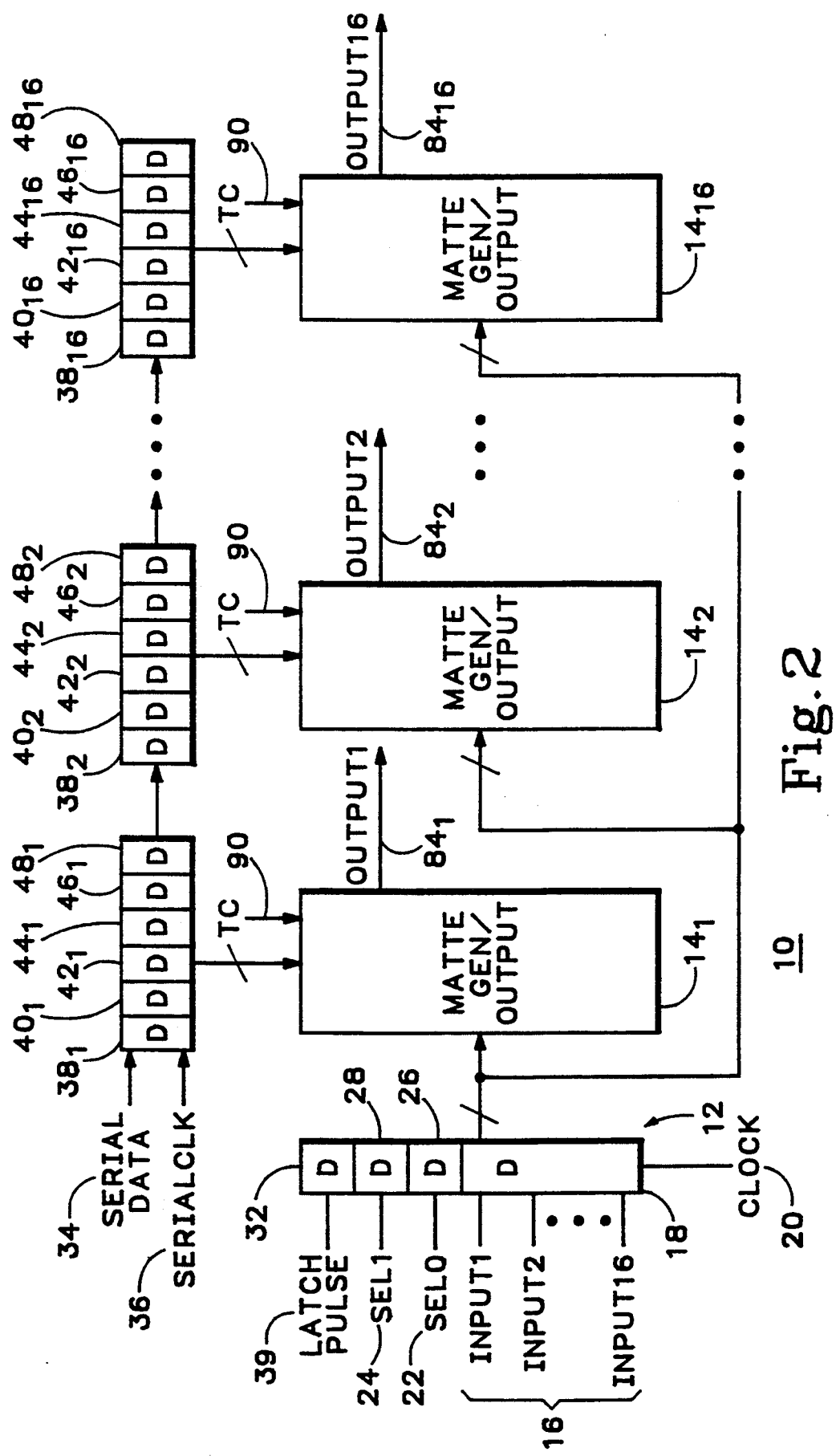
FIG. 2 is a block diagram of one of the crosspoint devices shown in FIG. 1.

Referring now to FIG. 2, each of the sixteen-by-sixteen-by-one bit crosspoint devices 10 comprises an input portion 12 and sixteen matte generation/output portions 14. The input portion 12 has sixteen input lines 16 (input 1, input 2, ..., input 16) each of which is connected to one line of one of the input buses. The sixteen lines, of the input buses respectively, carry data values of equal significance. The input lines 16 feed into D flip-flops 18, one flip-flop per input line. Each flip-flop 18 also receives a clock signal 20 for providing appropriate timing of the appearance of data at the flip-flop output. The input portion 12 also has select zero input 22 (SEL 0) and select one input 24 (SEL 1) supplying respective D flip-flops 26 and 28. Flip-flops 26 and 28 also are clocked by clock signal 20. The input portion also has a latch pulse input 30 which is connected to D flip-flop 32 and clocked by clock signal 20. Each of the flip-flops 18, 26, 28 and 32 has its output line provided as output of input portion 12. The output of input portion 12, which includes a data line for each of the aforementioned input lines 16, is supplied to each of plural matte generation/output portions $14_1$, $14_2$ ..., $14_{16}$. For the illustrated case, there are sixteen matte generation/output portions. Each portion $14_n$ has a separate output line $84_n$ connected to one line of one of the output buses. The sixteen lines, of the output buses respectively, are of equal significance.

Associated with each matte generation/output portion 14 is a set of six D flip-flops 38, 40, 42, 44, 46 and 48. A serial data line 34 supplies D flip-flop $38_1$ of portion $14_1$ with serial data under control of serial clock 36. Flip-flop $38_1$ supplies serial data to flip-flop $40_1$, flip-flop $40_1$ supplies data to flip-flop $42_1$ and so on. The sixth flip-flop $48_n$ associated with portion $14_n$, for n=1 ... 15, supplies serial data to the first flip-flop $38_{n+1}$ associated with the (n+1)th portion $14_{n+1}$. Serial clock 36 directs timing of serial input data transfer through the daisy chain of flip-flops $38_1$-$48_{16}$.

Figure 3:
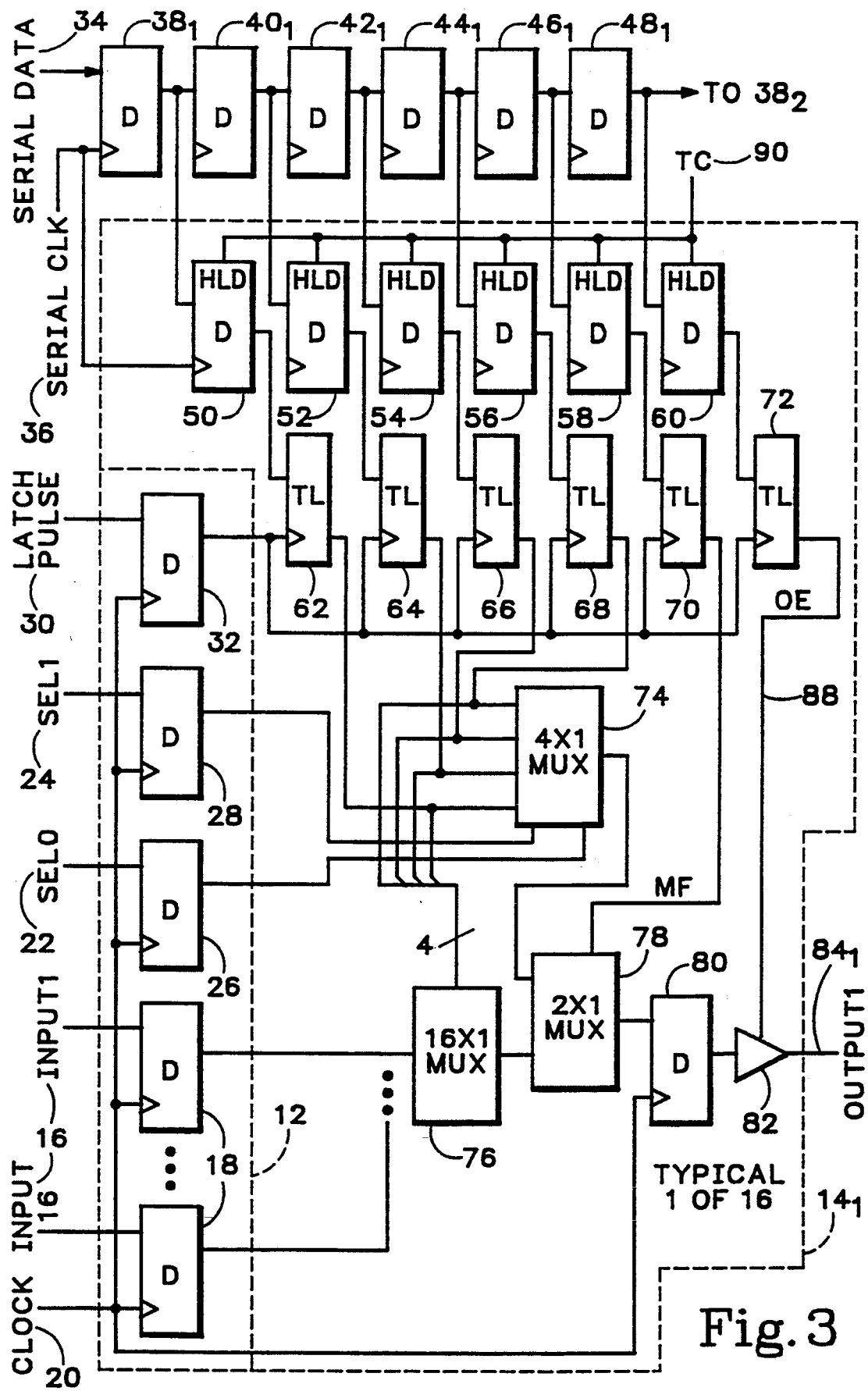
FIG. 3 is a block diagram of a typical one of sixteen output portions of the crosspoint device shown in FIG. 2.

Referring now to FIG. 3, which is a detailed block diagram of the matte generation/output portion $14_1$, the output of D flip-flop $38_1$ is provided as input to a D flip-flop 50 and in similar fashion, the outputs of flip-flops $40_1$, $42_1$, $44_1$, $46_1$ and $48_1$ are provided as inputs to flip-flops 52, 54, 56, 58 and 60 respectively. Each of flip-flops 50, 52, 54, 56, 58 and 60 also receives serial clock 36 for governing clocking of data. A hold line for each of D flip-flops 50, 52, 54, 56, 58 and 60 is tied to a terminal count input (TC) 90 which governs loading of data from flip-flops $38_1$, $40_1$, $42_1$, $44_1$, $46_1$ and $48_1$ into flip-flops 50, 52, 54, 56, 58 and 60, thereby providing double buffering of serial input data.

In a system employing sixteen output lines, the serial data is clocked into flip-flops 38-48 until such time as sufficient data has been supplied for the entire set of D flip-flops. In the illustrated embodiment, ninety-six serial data bits would load the six D flip-flops 38–48 associated with the sixteen matte generation/output portions 14. At such time as ninety-six bits of data have been clocked in, the terminal count (TC) line 90 is enabled and D flip-flops 50, 52, 54, 56, 58 and 60 load the respective outputs of D flip-flops 38, 40, 42, 44, 46 and 48 as their inputs, storing these new input values. In this manner, new values are loaded into the matte generation/output portion.

The outputs from flip-flops 50, 52, 54, 56, 58 and 60 are provided to transparent latches 62, 64, 66, 68, 70 and 72 respectively. The transparent latches 62, 64, 66, 68, 70 and 72 each receive the output of latch pulse flip-flop 32 as a clocking input, such that the latches will latch the data from flip-flops 50, 52, 54, 56, 58 and 60 upon receipt of a clocking pulse supplied from latch pulse input 30 through D flip-flop 32.

Matte generation/output portion $14_1$ includes a sixteen-by-one multiplexer 76, which receives the 16 inputs (input 1 . . . input 16) on its data input lines, as buffered by flip-flops 18 of input portion 12. The output lines of the transparent latches 62, 64, 66 and 68 are connected to the select lines of multiplexer 76. It will thus be appreciated that the data from transparent latches 62, 64, 66 and 68 direct the selection of one of input 1 through input 16, as buffered through D flip-flops 18, to be provided at the output of multiplexer 76. The output lines of the transparent latches are also connected to the data input lines of a four-by-one multiplexer 74, and the select lines for multiplexer 74 are provided by the select zero line 22 (SEL 0) as buffered by D flip-flop 26 and the select one line 24 (SEL 1) as buffered by D flip-flop 28.

The data outputs of multiplexers 74 and 76 are connected to the data input lines of a two-by-one multiplexer 78, which receives the output of transparent latch 70 as its select signal. Therefore, the value provided by transparent latch 70 will govern the selection by multiplexer 78 of either the output signal from multiplexer 74 or the output signal from multiplexer 76. The selection signal from latch 70 is a mode selection (MF) as will be discussed hereinbelow. The data output of two-by-one multiplexer 78 is supplied to a D flip-flop 80 which receives clock 20 as its clocking input. The output of flip-flop 80 is connected to the first output line (output 1) $84_1$ of the crosspoint device through tri-state buffer 82. The tri-state buffer is controlled by an output enable (OE) signal 88. Output enable signal 88 is provided by transparent latch 72.

It will therefore be seen that portion $14_1$ has three main operating configurations. In one configuration, the output enable signal is not asserted, buffer 82 is placed in a high impedance state, and no output is provided on line $84_1$. If the output enable signal is asserted, the operating configuration depends on whether multiplexer 78 selects multiplexer 74 or multiplexer 76.

When the multiplexer 78 selects the output of multiplexer 76, the output of multiplexer 78 reflects the signal provided at one of the inputs 16 of input portion 12. The input that is selected depends on the values provided by latches 62–68.

When the multiplexer 78 selects the output signal from multiplexer 74, the output of multiplexer 78 reflects the data value provided by at least one of latches 62–68. The signals that appear at select zero and select one govern which of the four input data signals to four-by-one multiplexer 74 will be selected as the multiplexer output by providing appropriate selection values to the multiplexer select lines. In one mode of operation, multiplexer 74 continuously selects a single input; in a second mode of operation, multiplexer 74 selects any two inputs in alternating fashion at clock rate; and in a third mode, multiplexer 74 selects the four inputs in a cyclically repeating sequence.

It will therefore be seen that the output of portion $14_1$ can reflect the data values loaded into flip-flops $38_1$–$44_1$, instead of any of the signals present at inputs 16. As will be described below, the data values can be used to allow the portion $14_1$ to generate a bit of a matte signal.

While FIG. 3 shows only the matte generation/output portion $14_1$ for one bit of a single output, each sixteen-by-sixteen-by-one crosspoint device 10 includes an additional fifteen matte generation/output portions $14_2$–$14_{16}$, producing the corresponding bits for the other outputs, if enabled.

Figure 4:
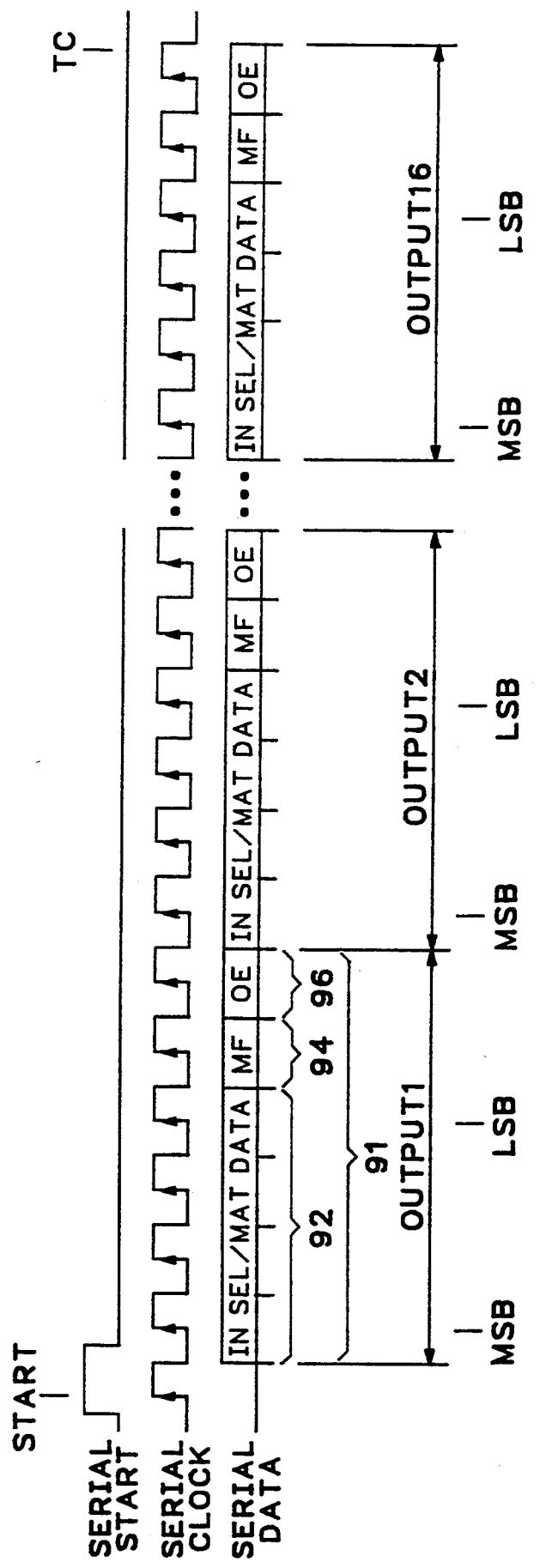
FIG. 4 is a timing diagram of serial input data to the crosspoint matrix.

As noted above, the operation of the crosspoint device 10 is such that it may provide a signal appearing at any one of sixteen inputs at any of its sixteen outputs, provide a matte signal at any of its sixteen outputs or place any output line in a high impedance state. The operation mode is governed by the serial data which is supplied to D flip-flops 38, 40, 42, 44, 46 and 48 via serial data line 34. FIG. 4 illustrates the format of data as it would be clocked into the flip-flops in an embodiment employing sixteen outputs. A set of six data bits 91 is provided for each output portion 14, wherein the six bits comprise four bits of input select or matte data (IN SEL/MAT DATA) 92, a mode bit (MF) 94 and an output enable bit (OE) 96. The mode bit defines whether the crosspoint device is in crosspoint or matte mode and for what purpose the IN SEL/MAT DATA 92 is employed. If the mode bit is one, the crosspoint device is in crosspoint mode wherein the IN SEL/MAT DATA is used as a select signal to multiplexer 76 resulting in an input (input 1 . . . input 16) being directed to one or more outputs. However, if the mode bit is zero, then the crosspoint device is in matte mode and the IN SEL/MAT DATA is interpreted as a matte value and provided through multiplexer 74 to eventually become the output data. The output enable (OE) bit governs whether the particular output line 84 (e.g. output 1) is enabled for output.

Referring to FIG. 3 and FIG. 4 together, the output enable bit (OE) 96 is clocked into D flip-flop 48, while the mode bit (MF) 94 is clocked into D flip-flop 46. The input selection/matte data bits 92 are clocked into flip-flops 38, 40, 42 and 44. The new data values from flip-flops 50–60 are not latched by transparent latches 62, 64, 66, 68, 70 and 72 until such time as a latch pulse signal 30 appears at D flip-flop 32 whereupon the transparent latches will latch the data values from D flip-flops 50, 52, 54, 56, 58 and 60 respectively. In a typical application of the crosspoint matrix within a video switcher, the latch pulse is asserted during a vertical blanking interval. The serial selection data and matte values may be provided by a central processing unit within a video switcher, with the particular data/values selected, for example, in response to manipulation of video switcher controls by an operator. Once the latching has occurred, the new values govern the operation of the crosspoint matrix. Therefore, when the operator decides that the crosspoint matrix should be reconfigured to connect a different signal source to a given output bus, he causes a new set of values to be loaded into the flip-flops 38–48 and these values are loaded into the flip-flops of crosspoint devices $10_1$–$10_{16}$. When the new set of values has been loaded, the latch pulse is asserted during the vertical blanking interval and the new values are latched into the transparent latches, changing the configuration of the crosspoint matrix.

The mode bit (MF), as provided by latch 70, directs multiplexer 78 to select either multiplexer 74 or multiplexer 76. If the mode bit is zero, then the multiplexer 78 selects the output of multiplexer 74 as its output, thereby providing a matte value to D flip-flop 80. Conversely, if the mode bit is a one, then multiplexer 78 selects the output of multiplexer 76 as its output. In such case, the four data bits provided by latches 62, 64, 66 and 68 direct which of the sixteen input signals to multiplexer 76 (input 1 . . . input 16) becomes the output of multiplexer 76.

As noted previously, the data values loaded into flip-flops $38_1$–$44_1$ associated with portion $14_1$ can be used to allow the portion $14_1$ to generate one bit of a matte signal. The data values loaded into the flip-flops 38–44 associated with the corresponding matte generation-/output portions of the crosspoint devices $10_2$–$10_{10}$ allow generation of the other bits of the matte signal. The format of the matte signal depends on the select zero and select one signals.

The select zero 22 (SEL 0) and select one 24 (SEL 1) signals direct the selection of an input data line of multiplexer 74 as the multiplexer output and enable each sample of the matte signal to be one of four values. This allows the crosspoint matrix to generate various forms of matte signals. For example, for a luma signal, the matte output would be constant, and therefore the selection lines 22 and 24 would remain unchanged, allowing a single one of latches 62, 64, 66 or 68 to provide the output for multiplexer 74. However, for a D1 chroma matte signal, the output will alternate between U and V values. Therefore, the select lines 22 and 24 are exercised such that the multiplexer 74 alternates between two of its input values. Either or both of select lines 22 and 24 may be toggled between a zero and one value to provide such alternating of the multiplexer output.

A D2 chroma matte signal is produced from a sequence of four samples. Therefore, both select zero and select one are operated as binary counters to provide sequential selection of the four inputs to four-by-one multiplexer 74. Therefore, the four values in latches 62–68 will sequentially appear at the output of multiplexer 74 and subsequently on the output line $84_1$. The exercising of select zero and select one may be accomplished via a state machine which cycles the select lines through a binary count pattern (e.g., 00, 01, 10, 11).

The illustrated crosspoint matrix allows the various data values to be loaded serially and not latched and switched in until such time as the latch pulse signal 30 is asserted. As noted above, the latch pulse is typically asserted during a vertical blanking interval. This is advantageous in that new values may be stored by a background task at non-critical rates, and when the new data is switched over in real time in response to the latch pulse, the switched data does not produce any visible noise.

The new input selection/matte data values are loaded in at a microprocessor speed rate, while the selection of matte values by multiplexer 74 may be done at real time rates via real time toggling of select one and select zero.

The illustrated crosspoint matrix does not necessitate an additional input line in parallel to the video input lines in order to allow selection of a matte.

The illustrated crosspoint matrix may be suitably employed to generate fixed depth values at the output of a chroma keyer crosspoint for video signals that do not include external depth information. Such a use would be appropriate in a system employing depth signal processing in the video switcher as described in co-pending U.S. patent application Ser. No. 07/904,404, entitled DEPTH SIGNAL PROCESSING IN A VIDEO SWITCHER, filed Jun. 25, 1992, the disclosure of which is hereby incorporated by reference herein.

It will be appreciated that the invention is not restricted to the particular embodiment that has been described, and that variations may be made therein without departing from the scope of the invention as defined in the appended claims and equivalents thereof. For example, while the foregoing embodiment employs the present invention as a matte generator, it may be employed more generally as generating sequences of numbers at outputs. Further, while the embodiment shows sixteen inputs and outputs, other numbers of input and output lines may be envisioned. The crosspoint matrix with integrated matte generators is suitably implemented as an integrated circuit, but other implementations may be used.

We claim:

1. A crosspoint device having a plurality of inputs for receiving respective input signals and also having first and second outputs, the crosspoint device being operable selectively to connect any one of its inputs to any selected one of its outputs, said crosspoint device comprising:

first transfer means coupled to the inputs of the crosspoint device for selectively transferring one of said input signals to an output of said first transfer means;

first signal generator means for providing a first data signal at an output thereof, the first data signal being dependent on a data value stored therein;

first selector means having one input terminal connected to the output of the first transfer means and another input terminal connected to the output of the first signal generator means, said first selector means being operative selectively to connect either the output of the first transfer means or the output of the first selector means to said first output;

second transfer means coupled to the inputs of the crosspoint device for selectively transferring one of said input signals to an output of said second transfer means;

second signal generator means for providing a second data signal at an output thereof, the second data signal being dependent on at least one data value stored therein; and second selector means having one input terminal connected to the output of the second transfer means and another input terminal connected to the output of the second signal generator means, said second selector means being operative selectively to connect either the output of the second transfer means or the output of the second selector means to said second output.

2. The crosspoint device according to claim 1, wherein said first signal generator means comprises a plurality of storage elements for storing respective data values and means for selecting at least one of said storage elements to provide said first data signal.

3. The crosspoint device according to claim 2, comprising means for sequentially selecting at least two of said storage elements to produce said first data signal.

4. The crosspoint device according to claim 2, wherein the first transfer means has at least one select input for receiving a signal for determining which input signal is transferred to the output of the first transfer means, and wherein one of said storage elements is connected to said select input.

5. The crosspoint device according to claim 2, further comprising loading means for loading data values into said storage elements.

6. A method of operating a crosspoint matrix having a plurality of input lines and a plurality of output lines comprising the steps of:
providing a first mode wherein stored values are employed as selection data to transfer input data from one of the input lines to one of the output lines as output data; and
providing a second mode wherein one of said stored values is transferred as the input data to the one output line as the output data.

7. The method according to claim 6 further comprising the step of switching said crosspoint matrix from a current mode to a next mode in response to an input switch signal, said current mode and said next mode comprising either said first mode or said second mode.

8. A crosspoint matrix having a plurality of input buses and at least one output bus comprising:
a plurality of crosspoint devices each having a plurality of inputs for receiving input signals from respective input data lines of said input buses and each also having an output for providing an output signal to said output bus, each of said crosspoint devices comprising
means for receiving an input signal at one of said inputs;
means for storing a signal associated with the crosspoint device; and
means for selecting either said stored signal or the input signal as an output signal and transferring the output signal to said output.

9. A crosspoint device comprising:
a plurality of input terminals;
an output terminal;
storage means for storing a data value and a mode value;
a first multiplexer having data input lines connected to said plurality of input terminals respectively and a select line connected to said storage means to receive said data value as a selection input for directing which of said input terminals is coupled to an output of said first multiplexer; and
a second multiplexer having data input lines for receiving the output of said first multiplexer and said data value from said storage means as data inputs and also having a select line for receiving from the storage means said mode value as a selection input for directing which of said second multiplexer's data input lines is coupled to an output of said second multiplexer, the output of said second multiplexer being connected to said output terminal.

10. A crosspoint device according to claim 9, wherein said storage means stores a plurality of data values and said mode value, and further comprising a third multiplexer having data input lines connected to receive said data values and a second signal as a selection input directing which of said plurality of data values is selected as output of the third multiplexer, the output of the third multiplexer being supplied as data input to the second multiplexer.

* * * * *